United States Patent
Engels et al.

(10) Patent No.: US 6,273,211 B1
(45) Date of Patent: Aug. 14, 2001

(54) ELECTRIC POWER-STEERING GEAR, IN PARTICULAR FOR MOTOR VEHICLES

(75) Inventors: Frank Peter Engels; Paul Hein, both of Solingen; Volker W. Lorenz, Neu-Ulm; Herbert Meckel, Erkrath; Ekkehard Boldt, Bergheim, all of (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/457,211

(22) Filed: Dec. 8, 1999

(30) Foreign Application Priority Data

Dec. 8, 1998 (EP) .................................................. 98123349

(51) Int. Cl.$^7$ ....................................................... B62D 5/04
(52) U.S. Cl. ....................... 180/446; 180/444; 74/388 PS
(58) Field of Search .................................... 180/443, 444, 180/446; 74/461, 388 PS

(56) References Cited

U.S. PATENT DOCUMENTS

| | | | |
|---|---|---|---|
| 4,770,612 | * | 9/1988 | Teubler ................................. 417/300 |
| 4,819,975 | * | 4/1989 | Morishita et al. ....................... 290/48 |
| 5,782,143 | * | 7/1998 | Ishikawa ................................. 74/760 |
| 6,050,155 | * | 4/2000 | Tortora .................................. 74/640 |

FOREIGN PATENT DOCUMENTS

| | | | |
|---|---|---|---|
| 6-38556 | * | 2/1994 | (JP) . |
| WO98/12097 | | 3/1998 | (WO) . |

* cited by examiner

*Primary Examiner*—Brian L. Johnson
*Assistant Examiner*—Avraham H. Lerner
(74) *Attorney, Agent, or Firm*—John E. Kajander

(57) ABSTRACT

In an electric power-steering gear, in particular for motor vehicles, having a steering shaft (1) which is actuated by a steering wheel and which forms an input for a step-down gear in the form of a harmonic drive (2) and which makes available an output, in the form of a steering element (3), to a conventional steering gear, sensors which output a signal for the steering torque which is applied being arranged on the steering shaft (1) in a known fashion, and said sensors leading, via a corresponding amplifier circuit, to an electric motor (10) which is arranged coaxially with respect to the steering shaft (1) and the steering element (3), the stator of the electric motor (10) is arranged fixed in terms of rotation in the externally toothed flexible rotor (4) and the elliptical driver (6) of the harmonic gear (2) acting, as a result of the elastically deformable, externally toothed flexible rotor (4), with migrating engagement on the internally toothed annular stator (5), which is fixed in position, and the flexible rotor (4) exerting a an auxiliary force on the steering element (3).

4 Claims, 3 Drawing Sheets

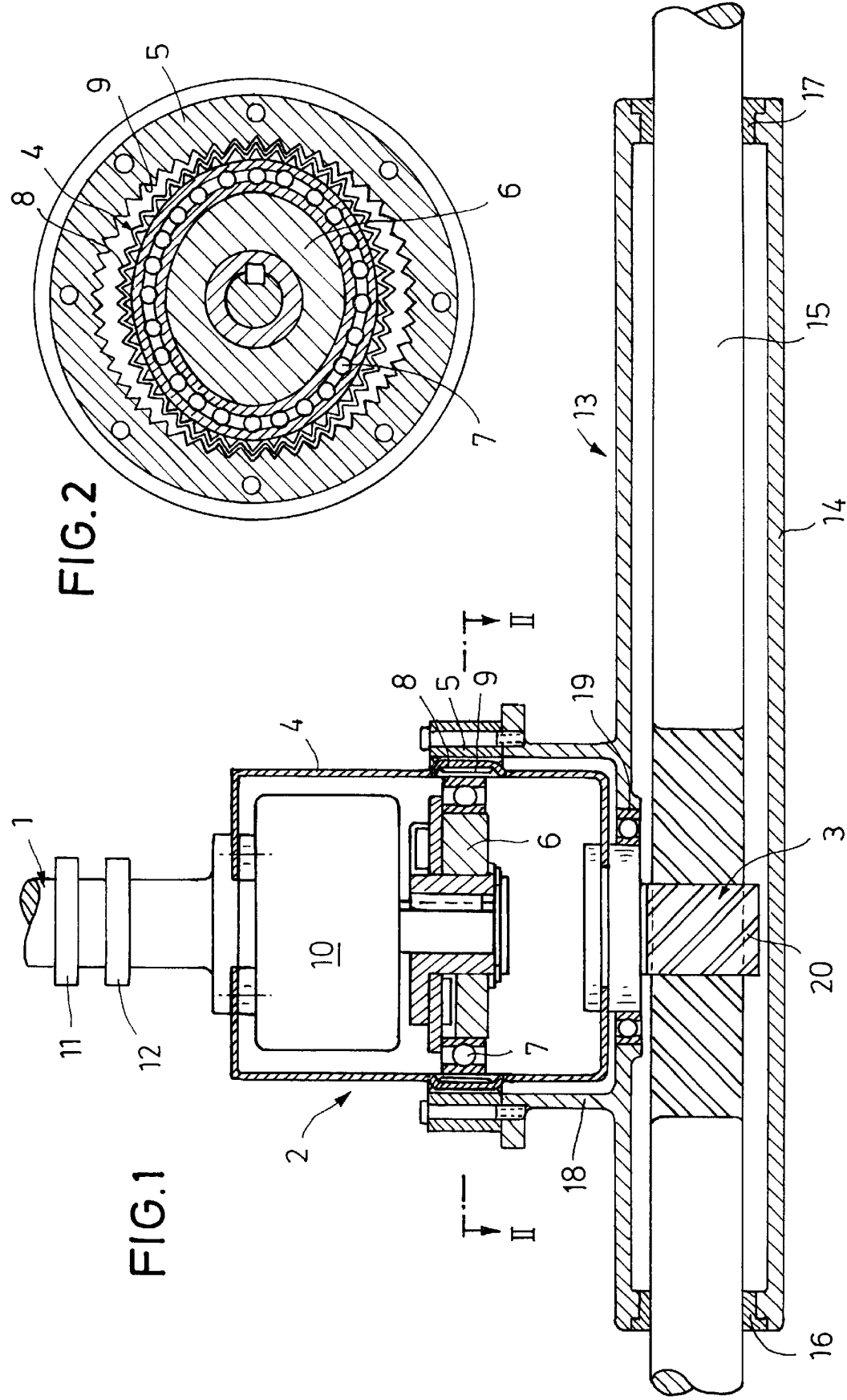

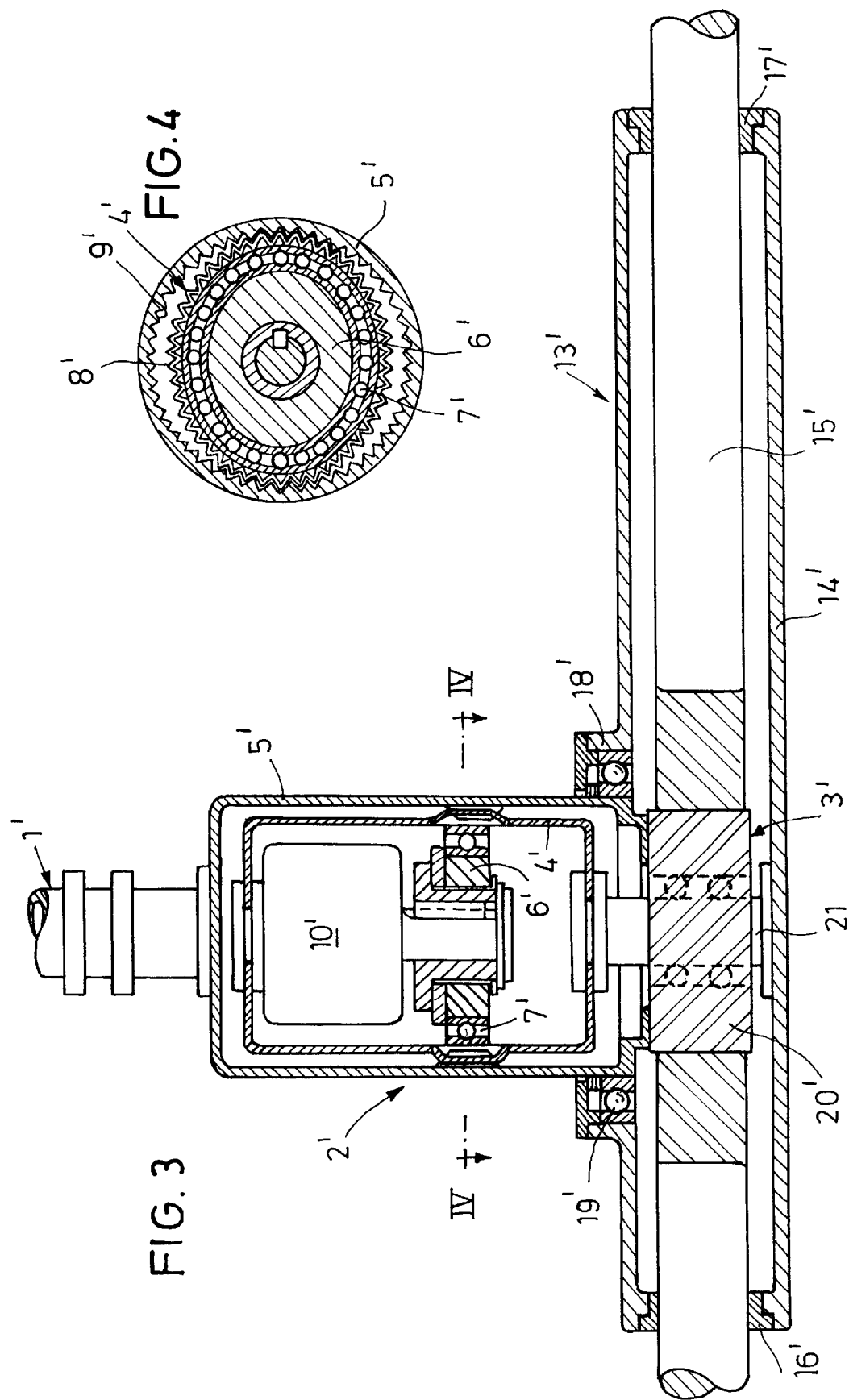

ELECTRIC POWER-STEERING GEAR, IN PARTICULAR FOR MOTOR VEHICLES

BACKGROUND OF THE INVENTION

The invention relates to an electronic power-steering gear, in particular for motor vehicles.

DESCRIPTION OF THE PRIOR ART

WO 98/12097 A1 discloses an electric power-steering gear, in particular for motor vehicles, which has been used to form the generic term of the present invention.

In this known power-steering gear, an electric motor drives a harmonic drive which is arranged coaxially with respect to the steering shaft, the stator of the electric motor and the stator of the harmonic drive being secured in the motor vehicle, and the steering shaft of the input element forming the input element and at the same time the output element of the harmonic drive which passes on the amplified steering movement to a corresponding steering gear.

The known electric power-steering gear has the disadvantage that the stator of the electric motor has to be fixed in position in the vehicle and a controllable link or locking device, which may have, for example, the form of an electromagnetically controllable clutch, has to be provided in the vehicle in order to fix the stator of the harmonic drive in position.

Furthermore, the known electric power-steering gear has the further disadvantage that it makes a considerable radial installation space necessary in the area of the steering shaft of a motor vehicle owing to the design of the electric motor as a disk-type rotor motor and also of the harmonic drive as a disk-type gear mechanism.

SUMMARY OF THE INVENTION

The object of the invention is to improve an electric power-steering gear, in particular for motor vehicles, of the type described herein, in such a way that, on the one hand, it requires less radial installation space and, in addition, does not need the stator of the electric motor to be secure in the vehicle or require a controllable clutch arrangement for securing the stator of the harmonic drive.

This object is achieved according to the invention in that an electric power-steering gear, in particular for vehicles, has the features specified herein.

By virtue of the fact that the stator of the electric motor is arranged fixed in terms of rotation within the elastically deformable, externally toothed, sleeve-shaped flexible rotor of the harmonic drive which is permanently connected to the steering shaft and is connected fixed in terms of rotation to the steering element, and the fact that power is supplied to the electric motor via slip rings or the like, for example helical cables, it is possible to dispense with securing the stator of the electric motor in the vehicle, which is necessary in the known arrangement, and with the controlled clutch for securing the stator of the harmonic drive, as a result of which the installation of the electric power-steering gear is made significantly easier.

An alternative embodiment of an electric power-steering gear is also described herein, in which the functions of the stator and the output element of the harmonic drive have been interchanged.

Further details of the invention are explained in the further claims.

BRIEF DESCRIPTION OF THE DRAWINGS

The invention is explained in more detail with reference to exemplary embodiments shown in the drawings, in which:

FIG. 1 shows a schematic section through an electric power-steering gear according to the invention, in its arrangement on a steering gear which is designed as a rack and pinion gear;

FIG. 2 shows a section along the line II—II in FIG. 1;

FIG. 3 shows a schematic section through a further embodiment of an electric power-steering gear with the interchanged arrangement of stator and rotor of the harmonic drive, again in conjunction with a rack and pinion gear;

FIG. 4 shows a section along the line IV—IV in FIG. 3, and

DESCRIPTION OF THE PREFERRED EMBODIMENTS

Figure 5:
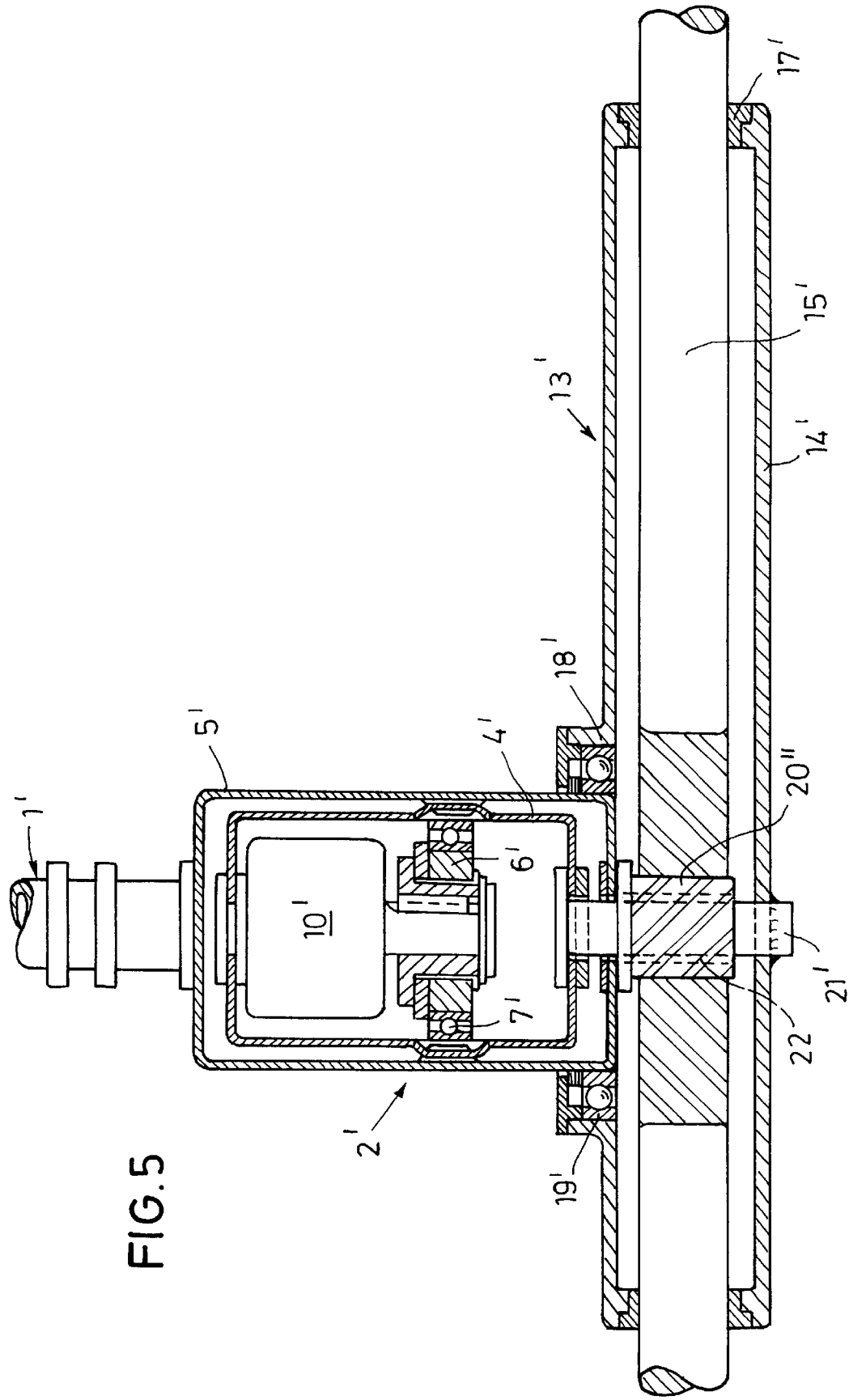
FIG. 5 shows a schematic representation of a further embodiment of an electric power-steering gear according to the invention.

In the first embodiment of the invention shown in FIGS. 1 and 2, a steering shaft 1 which is actuated by a steering wheel (not shown) is directly connected, fixed in terms of rotation, to the harmonic drive 2, or its output element or steering element 3, which harmonic drive is arranged concentrically with respect to said steering shaft 1.

The electric power-steering gear in the form of a harmonic drive 2 thus has a gear input in the form of the steering shaft 1 and a gear output in the form of the steering element 3, the elastically deformable, externally toothed, sleeve-shaped flexible rotor 4 being connected fixed in terms of rotation to the steering shaft 1 and the steering element 3 in the present embodiment.

The harmonic drive 2 comprises, as is known, not only the flexible rotor 4 but also an internally toothed annular stator 5 and an elliptical generator 6, which acts on the elastically deformable, sleeve-shaped flexible rotor 4 via an appropriate ball-bearing arrangement 7, in order to bring the external toothing 8 of said flexible rotor 4 into engagement with the internal toothing 9 of the fixed annular stator 5.

The elliptical generator 6 is driven here by an electric motor 10 which is arranged concentrically within the sleeve-shaped flexible rotor 4 and is supplied with appropriately controlled power from outside via, for example, slip rings 11 and 12 on the steering shaft 1.

The harmonic drive 2 also comprises an annular stator 5, which has to be arranged fixed in position in the vehicle.

As the generator 6 turns, the large elliptical axis, and thus the area of engagement between the teeth of the flexible rotor 4 and those of the annular stator 5, is displaced.

With a fixed annular stator 5, the flexible rotor 4 rotates as an output drive element, in the opposite direction to the drive.

The actual steering gear 13 is designed, for example, in the present embodiment as a rack and pinion gear, but it is self-evident that the output element of the electric power-steering gear, the steering element 3, can also act on another, known steering gear.

The rack and pinion gear 13 essentially comprises a steering casing 14, in which a toothed rack 15 is axially displaceably arranged in bearings 16 and 17 and has a pinion connector 18 in which the steering shaft 1 is mounted with the flexible rotor 4 and the steering element 3 in a correspondingly rotatable fashion by means of a bearing arrangement 19, the steering element 3 being designed here directly in the form of a corresponding pinion 20 for the toothed rack 15.

The annular stator 5 of the harmonic drive 2 is secured in a manner fixed in terms of rotation to the pinion connector 18 in a suitable way, for example by means of screws.

If a specific steering torque is applied via the steering shaft 1, a signal for the introduced steering torque is output via sensors, which are known per se, and is passed on via a corresponding amplifier circuit to the electric motor 10 and causes said motor to set the generator 6 of the harmonic drive 2 in rotation.

Since the steering shaft 1 and the flexible rotor 4 with the steering element 3 are directly connected to one another fixed in terms of rotation and/or are formed from one piece, the auxiliary force which results from the rolling movement of the flexible rotor 4 within the fixed annular stator 5 can act directly on the steering element 3 forming the pinion 20, in order to displace the toothed rack 15, and the driver, by means of the force with which he holds the steering wheel or the steering torque which is applied, makes available the necessary reaction torque via the steering shaft 1.

In the event of the electric power supply failing, the driving link between the steering shaft 1 via the flexible rotor 4 to the steering element 3 is maintained and the vehicle can readily be steered, albeit with an increased expenditure of force. It is not necessary to release a clutch arrangement in a selective fashion.

In the case of the embodiments shown in FIGS. 3 and 4, a steering shaft 1', a harmonic drive 2' and a rack and pinion gear 13' are shown again.

The harmonic drive 2' comprises, this time, a flexible externally toothed flexible stator 4', which is in engagement with an internally toothed annular rotor 5', the migrating engagement being brought about again by an elliptical generator 6' via a roller bearing arrangement 7', in order to bring the external toothing 8' of the elastically deformable flexible stator 4' into migrating engagement with the internal toothing 9' of the rotatably arranged annular rotor 5'.

In the present embodiment, the elastically deformable flexible stator 4' is secured in a manner fixed in positional terms to the steering gear 13' via a journal 21, and the steering shaft 1' is connected fixed in terms of rotation to the annular rotor 5' which is rotatably mounted by means of a bearing arrangement 19' and which is provided on its external circumference with a pinion toothing 20' which engages directly in the appropriate toothing of a toothed rack 15'.

This arrangement makes it possible to select a relatively large pinion diameter.

FIG. 5 shows a further version of this arrangement in which the additional connection of an externally toothed pinion 20'', which engages in the pinion toothing 3, 3' and the toothing of the toothed rack 15, 15', provides a possibility of varying the transmission ratio of the gear over a relatively large range. The stationary support of the flexible stator 5' is provided again via a journal 21' which is secured to the steering casing. Via a bearing bushing 22, the journal 21' forms a support for the pinion 20'' which is connected to the annular rotor 5'.

In both embodiments, the electric motor 10' for driving the elliptical generator 6' is arranged within the sleeve-shaped, elastically deformable flexible stator 4' and has to be supplied with the necessary power lines in a suitable way, it then being possible for this to be effected by means of simple line connections since the sleeve-shaped flexible stator 4' is fixed in position in a stationary fashion, it being possible to route the line connections via the stationary journals 21 and 21', for example.

The Power-steering gear can not only be integrated into or built onto the steering gear 13, as illustrated in the drawings, but also installed at any other desired point on the transmission path for steering torque.

What is claimed is:

1. An electric power-steering apparatus for use in motor vehicles, comprising:
   a harmonic drive (2);
   a steering shaft (1) which forms an input for said harmonic drive (2);
   a steering element (3) driven by said harmonic drive (2) in response to said steering shaft (1);
   wherein said harmonic drive (2) further comprises:
      an elastically deformable, sleeve-shaped flexible rotor (4) having external teeth (8) and being connected fixed in terms of rotation to the steering shaft (1) and to the steering element (3);
      an annular stator (5) being secured to a pinion connector (18) of a steering casing (14) and having internal teeth (9) for matingly engaging said external teeth (8);
      an electric motor (10) being electronically responsive to torque applied to said steering shaft (1) and arranged coaxially with respect to the steering shaft (1) and the steering element (3) and fixed in terms of rotation within said elastically deformable, sleeve-shaped flexible rotor (4), said electric motor (10) being permanently connected to the steering shaft (1) and further connected fixed in terms of rotation to the steering shaft (1) and to the steering element (3); and
      an ellipsoidal generator (6) directly driven by said electric motor (10) to drivingly engage said elastically deformable, sleeve-shaped flexible rotor (4).

2. The electric power-steering apparatus as claimed in claim 1, wherein said steering element (3) further comprises a rack and pinion steering gear (13) having a pinion (20) driven by said harmonic drive (2) in response to said steering shaft (1).

3. An electric power-steering apparatus for use in motor vehicles, comprising:
   a harmonic drive (2');
   a steering shaft (1') which forms an input for said harmonic drive (2');
   a steering element (3') driven by said harmonic drive (2') in response to said steering shaft (1');
   wherein said harmonic drive (2') further comprises:
      an elastically deformable, sleeve-shaped flexible stator (4') having external teeth (8') and being rigidly secured to by a journal (21) to a steering casing (14);
      an annular rotor (5') being connected fixed in terms of rotation to the steering shaft (1') and to the steering element (3') and rotatably disposed relative to a pinion connector (18') of said steering casing (14') and having internal teeth (9') for matingly engaging said external teeth (8');
      an electric motor (10') being electronically responsive to torque applied to said steering shaft (1') and arranged coaxially with respect to the steering shaft (1') and the steering element (3') and fixed in terms of rotation within said elastically deformable, sleeve-shaped flexible stator (4'), said electric motor (10') being permanently connected to the steering shaft (1') and further connected fixed in terms of rotation to the steering shaft (1') and to the steering element (3'); and
      an ellipsoidal generator (6') directly driven by said electric motor (10') to drivingly engage said elastically deformable, sleeve-shaped flexible stator (4').

4. The electric power-steering apparatus as claimed in claim 3, wherein said steering element (3') further comprises a rack and pinion steering gear (13') having a pinion (20') driven by said harmonic drive (2') in response to said steering shaft (1').

* * * * *